United States Patent [19]

Räsänen et al.

[11] Patent Number: 5,459,572
[45] Date of Patent: Oct. 17, 1995

[54] MIRROR ARRANGEMENT IN A FOCUSING INTERFEROMETER

[75] Inventors: Jaakko Räsänen, Espoo; Jyrki Kauppinen, Ilmarinen, both of Finland

[73] Assignee: Temet Instruments Oy, Helsinki, Finland

[21] Appl. No.: 258,674

[22] Filed: Jun. 13, 1994

[30] Foreign Application Priority Data

Jun. 17, 1993 [FI] Finland .................................. 932815

[51] Int. Cl.⁶ ............................................... G01B 9/02
[52] U.S. Cl. .......................... 356/345; 356/244; 356/346
[58] Field of Search ............................. 356/345, 346, 356/244

[56] References Cited

U.S. PATENT DOCUMENTS

| | | | |
|---|---|---|---|
| Re. 32,912 | 4/1989 | Doyle | 356/346 |
| 4,095,899 | 6/1978 | Vanasse | 356/346 |
| 4,095,900 | 6/1978 | Murphy et al. | 356/346 |
| 4,319,843 | 3/1982 | Gornall | 356/346 |
| 4,383,762 | 5/1983 | Burkert | 356/346 |
| 4,773,757 | 9/1988 | Doyle | 356/346 |
| 4,795,253 | 1/1989 | Sandridge et al. | 356/346 |
| 4,991,961 | 2/1991 | Strait | 356/346 |
| 5,048,970 | 9/1991 | Milosevic et al. | 356/244 |
| 5,066,990 | 11/1991 | Rippel | 356/346 |
| 5,159,405 | 10/1992 | Ukon | 356/346 |

FOREIGN PATENT DOCUMENTS

| | | |
|---|---|---|
| 83702 | 4/1991 | Finland . |
| 3736694 | 6/1989 | Germany . |
| 87/02448 | 4/1987 | WIPO . |

*Primary Examiner*—Samuel A. Turner
*Assistant Examiner*—Jason D. Eisenberg
*Attorney, Agent, or Firm*—Merchant, Gould, Smith, Edell, Welter & Schmidt

[57] ABSTRACT

A focusing interferometer, wherein the focusing and orientation of the different mirrors of the interferometer have been successfully facilitated by combining the focusing mirror and the collimating mirror to provide a single spherical mirror surface and by reversing the paths of light that start from the beam splitter by assembly of mirrors which are arranged back-to-back to reflect to opposite directions such that their optical axes join, each of the mirrors including three flat mirror surfaces that are perpendicular to one another and are arranged to reflect to the direction of the point where the normals of the mirror surfaces intersect.

5 Claims, 1 Drawing Sheet

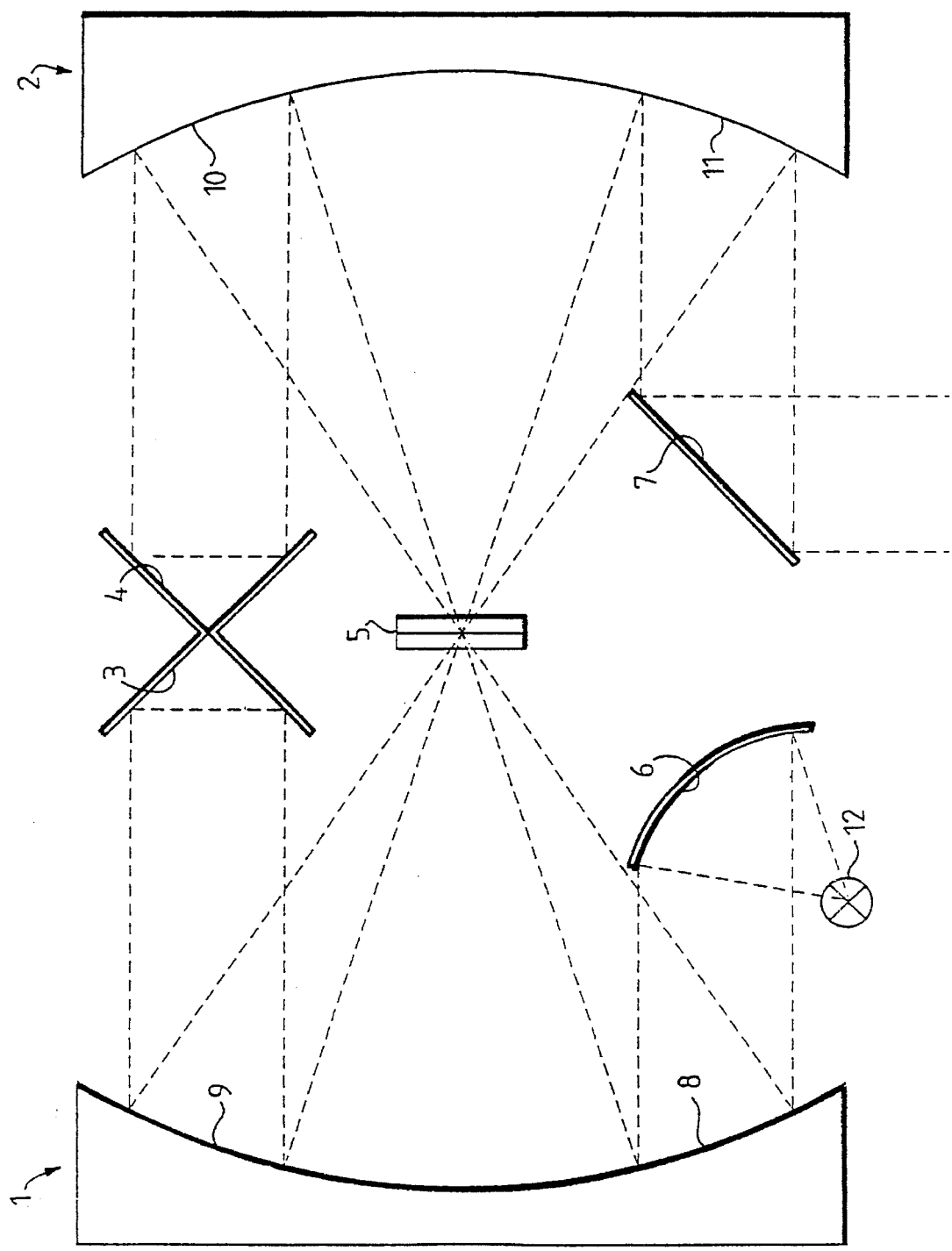

MIRROR ARRANGEMENT IN A FOCUSING INTERFEROMETER

FIELD OF THE INVENTION

The invention concerns a focusing interferometer comprising a light source, a first mirror for collimating the light emitted from the light source, a second mirror for focusing the collimated light emitted from the first mirror, a beam splitter arranged in the focus of the light emitted from the second mirror in order to split the light into a reflected part and a transmitted part, a third mirror for collimating the light reflected from the beam splitter, a fourth mirror for collimating the light passed through the beam splitter, a fifth mirror for reflecting the collimated light emitted from the third mirror back to said third mirror and further focusing it on the beam splitter, and a sixth mirror for reflecting the collimated light emitted from the fourth mirror back to said fourth mirror and further focusing it on the beam splitter, the fifth and sixth mirror being arranged back-to-back to reflect to opposite directions such that their optical axes join, whereby the light returned from the fifth mirror and passed through the beam splitter and the light returned from the sixth mirror and reflected from the beam splitter interfere with each other.

When the paths of light are of the same magnitude in an interferometer of the type described above, interference maxima of all wavelengths of light are attained. When an evenly changing path difference is effected between these paths e.g. by moving one or both of the mirrors that divert the travel direction of light, the wavelengths of the light passed through the interferometer can be detected by the interferences of the different wavelengths.

However, the known interferometer described in the introductory paragraph involves some problems. First, the mirrors of the interferometer, particularly the second mirror which focuses the light on the beam splitter and the third mirror upon which the light emitted from the beam splitter incidents, have to be focused very carefully on each other and the beam splitter so that the focuses of the mirrors are at the same point on the beam splitter. The mirrors are typically off-axis parabolic mirrors, which are rather expensive to manufacture. The maintenance of the focus as well as the effecting thereof is problematic since all kinds of mechanical vibrations and interferences may cause changes in the focus of these mirrors. Another, more severe problem concerns the mirrors which are called the fifth and sixth mirror in the introductory paragraph and which have to be moved during the use of the device to effect a path difference and thereby attain interference maxima on different frequencies. In a known interferometer said mirrors are flat mirrors arranged back-to-back to reflect to opposite directions. Theoretically, their optical axes can be arranged to coincide with great accuracy, but in practice even slight vibrations or uneven operation of the mirror moving mechanism may make the mirrors tilt slightly, which causes a so-called angle error between the beams reflected by said mirrors. Since the mirrors are arranged back-to-back, this kind of angle error affects the beams reflected by these mirrors in opposite directions, which doubles its effect. Thus the known interferometer is very demanding in respect of the mirror moving mechanism. Interferometers are also generally very sensitive to disturbances in the movement and orientation of the moveable mirror. In a typical solution used in an interferometer, the mass of the moveable mirror is great and the mirror is mounted on air bearings, whereby it can be made to move as evenly as possible e.g. by means of a solenoid. This kind of structure may be optimal in laboratory conditions when the interferometer has been focused carefully, but even slight disturbances in the focusing or external effects particularly in the moving direction of the mirror may thoroughly disrupt the operation of the device.

SUMMARY OF THE INVENTION

The object of the present invention is to provide a focusing interferometer in which the above problems have been solved such that the interferometer is much easier to focus and essentially less sensitive to external effects. This is achieved with the interferometer according to the invention, which is characterized in that the second mirror and the third mirror are combined to provide a single uniform mirror surface, and that each of the fifth and sixth mirror comprises three flat mirror surfaces that are perpendicular to one another and are arranged to reflect to the direction of the point where the normals of the mirror surfaces intersect.

With the solution according to the invention, the focusing and collimating mirrors can thus be combined to provide a single mirror surface, whereby the position of these mirrors in relation to each other is always automatically correct. Second, when instead of flat mirrors so called cube corners comprising three flat mirror surfaces perpendicular to one another are used as reflecting mirrors, these mirrors are rendered essentially less sensitive to angle errors. The basis of this is that cube corners always return the incident light parallel to the incident direction. Thus only such effects that cause the vertices of the cube corners to be displaced from the common optical axis can result in an angle error. Since in the invention the cube corners are positioned back-to-back, the vertices of the cube corners are relatively close to one another, whereby the angle error must be quite big to effect a displacement from the original optical axis that is of the magnitude that affects the operation of the device.

Advantageously, the mirror surface formed by the second and third mirror is a spherical mirror surface. Thus not only is it possible to combine mirrors previously implemented as two separate off-axis parabolic mirrors, but also it is possible to implement these mirrors as a spherical mirror surface, which is significantly less expensive to manufacture than off-axis parabolic mirrors.

The interferometer according to the invention can be supplemented such that it further comprises a seventh mirror for collimating the interfering light emitted from the beam splitter, and that the fourth and seventh mirror are combined to provide a single uniform mirror surface. Thus the act of combining mirrors as described above can also be utilized in connection with the fourth and seventh mirror, which further reduces the problems involved in the focusing of the different mirrors in interferometers. The second combined mirror can also be advantageously implemented as a spherical mirror surface and even as a spherical mirror surface that is identical to the spherical mirror surface formed by the second and third mirror. This further reduces the costs of manufacture of the interferometer according to the invention.

BRIEF DESCRIPTION OF THE DRAWING

In the following the focusing interferometer according to the invention will be described in greater detail with reference to the schematic figure of the accompanying drawing showing a schematic view of the general structure of the focusing interferometer according to the invention.

DESCRIPTION OF THE PREFERRED EMBODIMENT

The interferometer according to the invention comprises a source of light 12, which is advantageously a light source emitting infrared light. The light emitted from this light source is collimated by an off-axis parabolic mirror 6 to a focusing mirror surface 8, which focuses it on a beam splitter 5. From this beam splitter, part of the light is reflected to a collimating mirror surface 9 while part of it passes through the beam splitter 5 to a collimating mirror surface 10. The focusing mirror surface 8 and the collimating mirror surface 9 form part of a uniform spherical mirror surface 1. The mirror surface 9 collimates the light, directing it to a cube corner 3, whose optical axis is arranged to be parallel with the collimated beams emitted from the mirror surface 9. The cube corner comprises three flat mirror surfaces that are perpendicular to one another and are arranged to reflect to the direction of the point where the normals of the mirror surfaces intersect. In practice, the mirror 3 thus looks like a cube corner when seen from the inside of the cube. The cube corner 3 reflects the beam back to the mirror 9, from which it is focused on the beam splitter 5 and in part through it on a collimating mirror surface 11.

The path of the light emitted from the focusing mirror surface 8 and passed through the beam splitter 5 proceeds to a collimating mirror surface 10, which collimates the light to a cube corner 4, which is structurally identical to the cube corner 3. The cube corners 3 and 4 are arranged back-to-back such that they reflect to opposite directions and that their optical axes join. In practice, the vertices of these cube corners are arranged as close to each other as possible so that inclination of the mirrors has as small an effect as possible on the direction of the beams of light they reflect. If the theoretical situation where the vertices of the cube corners 3 and 4 coincide were reached, no angle error would occur. In practice this is not possible, however, but the present arrangement is essentially less sensitive to angle errors than an arrangement comprising two flat mirrors arranged back-to-back. If with flat mirrors an inclination of only a few micrometers is allowed, with cube corners—used e.g. in the arrangement according to the present invention—an inclination of even a few hundred micrometers can be allowed. On account of this, the mirror moving mechanism can be simplified significantly from what it has been. It is noted that in the invention—just as with flat mirrors—movement perpendicular to the optical axis of the mirrors does not result in an angle error.

When the beam is reflected back from the cube corner 4, the mirror 10 focuses it back on the beam splitter 5, whereby part of it is reflected in the same direction as the light emitted from the mirror 9 and passed through the beam splitter 5. These two beams of light interfere with each other on all frequencies if the paths of light from the beam splitter 5 to the mirror 9 and further to the cube corner 3 on the one hand and from the beam splitter 5 to the mirror 10 and further to the cube corner 4 on the other hand are of the same magnitude. When these distances are changed, interference maxima are attained on different frequencies. When the distance is changed at an even rate, said interference maximum can be made to transfer evenly from one wavelength to the other. If it is possible to monitor the changes of distance as they take place, it is also possible to find the frequency on which the interference maximum is attained at a given moment. In practice this is achieved by measuring the paths of light by means of a laser beam conducted over the same path as the interfering light. Since laser light is very monochromatic, its interference maxima are known, and it is thus also possible to identify the corresponding points in the light emitted from the interferometer.

In the interferometer according to the invention, the interfering light is further conducted to the collimating mirror surface 11, which collimates the light and directs it to a flat mirror surface 7, after which the light proceeds outside the interferometer and further through the sample to be analyzed to a suitable detector. These conventional structural components are not described in greater detail in the present application. In the interferometer according to the invention, the mirror surface 10 and the mirror surface 11—like the mirror surfaces 8 and 9—are combined to provide a single uniform mirror surface 2, which is advantageously a spherical mirror surface. Due to this, the spectrometer according to the invention is especially compact and the mirrors 10 and 11 can be focused on the beam splitter 5 by a single action. Another practical advantage achieved is that the combined mirror surfaces 1 and 2 may be mutually identical spherical mirror surfaces, which further reduces the costs of manufacture of the interferometer according to the invention.

The focusing interferometer according to the invention is described above by means of one exemplary embodiment only, and it is to be understood that it can be modified to some extent without deviating from the scope determined by the accompanying claims. These modifications may especially concern the light source, the mirror 6 collimating the light emitted from the light source, the structure and position of the mirror 11 used for processing the interfering light, and the structure and position of the mirror upon which the collimated light emitted from said mirror 11 incidents.

We claim:

1. A focusing interferometer comprising a light source, a first mirror for collimating the light emitted from the light source, a second mirror for focusing the collimated light emitted from the first mirror, a beam splitter arranged in the focus of the light emitted from the second mirror in order to split the light into a reflected part and a transmitted part, a third mirror for collimating the light reflected from the beam splitter, a fourth mirror for collimating the light passed through the beam splitter, a fifth mirror for reflecting the collimated light emitted from the third mirror back to said third mirror and further focusing it on the beam splitter, and a sixth mirror for reflecting the collimated light emitted from the fourth mirror back to said fourth mirror and further focusing it on the beam splitter, the fifth and sixth mirrors being arranged back-to-back to reflect to opposite directions such that their optical axes join, whereby the light returned from the fifth mirror and passed through the beam splitter and the light returned from the sixth mirror and reflected from the beam splitter interfere with each other, wherein the second mirror and the third mirror are combined to provide a single uniform mirror surface, and each of the fifth and sixth mirrors comprises three flat mirror surfaces that are perpendicular to one another and are arranged to reflect to a direction of a where normals of the mirror surfaces intersect.

2. A focusing interferometer according to claim 1, wherein the mirror surface formed by the second and third mirrors is a spherical mirror surface.

3. A focusing interferometer according to claim 2, further comprising a seventh mirror for collimating the interfering light emitted from the beam splitter, and the fourth mirror and the seventh mirror being combined to provide a single uniform mirror surface.

4. A focusing interferometer according to claim 3, wherein the mirror surface formed by the fourth and seventh mirrors is a spherical mirror surface.

5. A focusing interferometer according to claim 4, wherein the spherical mirror surface formed by the second and third mirrors and the spherical mirror surface formed by the fourth and seventh mirrors are identical to each other.

* * * * *